(12) United States Patent
Agulnik et al.

(10) Patent No.: US 8,193,934 B2
(45) Date of Patent: Jun. 5, 2012

(54) METHOD FOR USING RECORDING RULES AND PREVIOUS VALUE SELECTION RULES FOR PRESENCE INFORMATION IN A COMMUNICATIONS SYSTEM

(75) Inventors: Anatoly Agulnik, Deerfield, IL (US); Tyrone D. Bekiares, Chicago, IL (US); Peter M. Drozt, Prairie Grove, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 448 days.

(21) Appl. No.: 12/570,175

(22) Filed: Sep. 30, 2009

(65) Prior Publication Data

US 2011/0074579 A1  Mar. 31, 2011

(51) Int. Cl.
*G08B 13/14* (2006.01)

(52) U.S. Cl. ............... 340/541; 340/540; 340/425.5; 340/435; 340/436; 709/203; 709/207; 709/223; 709/224; 709/238

(58) Field of Classification Search .......... 340/541, 340/540, 425.5, 435, 436; 709/203, 207, 709/223, 224, 238
See application file for complete search history.

(56) References Cited

U.S. PATENT DOCUMENTS

| | | | |
|---|---|---|---|
| 2002/0052931 A1* | 5/2002 | Peiffer et al. | 709/218 |
| 2003/0005455 A1* | 1/2003 | Bowers | 725/90 |
| 2003/0041101 A1 | 2/2003 | Hansche | |
| 2006/0069686 A1 | 3/2006 | Beyda et al. | |
| 2008/0101763 A1 | 5/2008 | Bhogal et al. | |
| 2009/0154689 A1 | 6/2009 | Portman et al. | |

OTHER PUBLICATIONS

PCT International Search Report Dated Sep. 1, 2011 for Counterpart Application.

* cited by examiner

*Primary Examiner* — Tai T Nguyen
(74) *Attorney, Agent, or Firm* — Valerie M. Davis

(57) ABSTRACT

In a communications system, a presence server maintains and distributes presence information in accordance with recording rules and previous value selection rules. The presence server: associates a recording rule with each presence information element in a subset of a plurality of presence information elements for a presentity; maintains a set of previous values according to the recording rule associated with the presence information element, for each presence information element in the subset; receives an initial subscribe request from a watcher for one or more presence information elements in the subset; and in response to the initial subscribe request, notifies the watcher of a number of the previous values maintained for each presence information elements in the subscribe request, wherein the number of the previous values that is sent is determined by a previous value selection rule associated with each presence information element.

15 Claims, 3 Drawing Sheets

METHOD FOR USING RECORDING RULES AND PREVIOUS VALUE SELECTION RULES FOR PRESENCE INFORMATION IN A COMMUNICATIONS SYSTEM

FIELD OF THE DISCLOSURE

The present disclosure relates generally to providing presence information and more particularly to a method for using recording rules and previous value selection rules for providing presence information in a communications system.

BACKGROUND

With the advancement in technology, communications systems are capable of providing better services to the users. In some applications that make use of presence services, communication devices report (referred to in the art as "publishing" or "updating") to a central network entity (referred to in the art as a "presence server") status or presence information of users of the communication devices (referred to in the art as "presentities"). The presence server distributes (referred to in the art as "notifying") the presence information to other users (referred in the art as "watchers") in the communications system. Generally, the presence information includes information such as the status of the communication device, availability of a user of the device, location of the communication device, current operation being performed by the device, preferred communications of the user, and the like.

Standard presence functionality allows a watcher (user, device, or application) to subscribe to the presence server to receive presence information related to one or more presentities. The subscription can be done individually for the one or more presentities or by using a presence Resource List that includes multiple presentities. Upon subscribing to the one or more specified presentities, the watcher is notified of presence information for the specified presentites. However, currently there is no mechanism that can enable a watcher to receive specific previous values for some presence information elements of specified presentites.

Accordingly, there is a need for a method for using recording rules and previous value selection rules for providing presence information in a communications system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
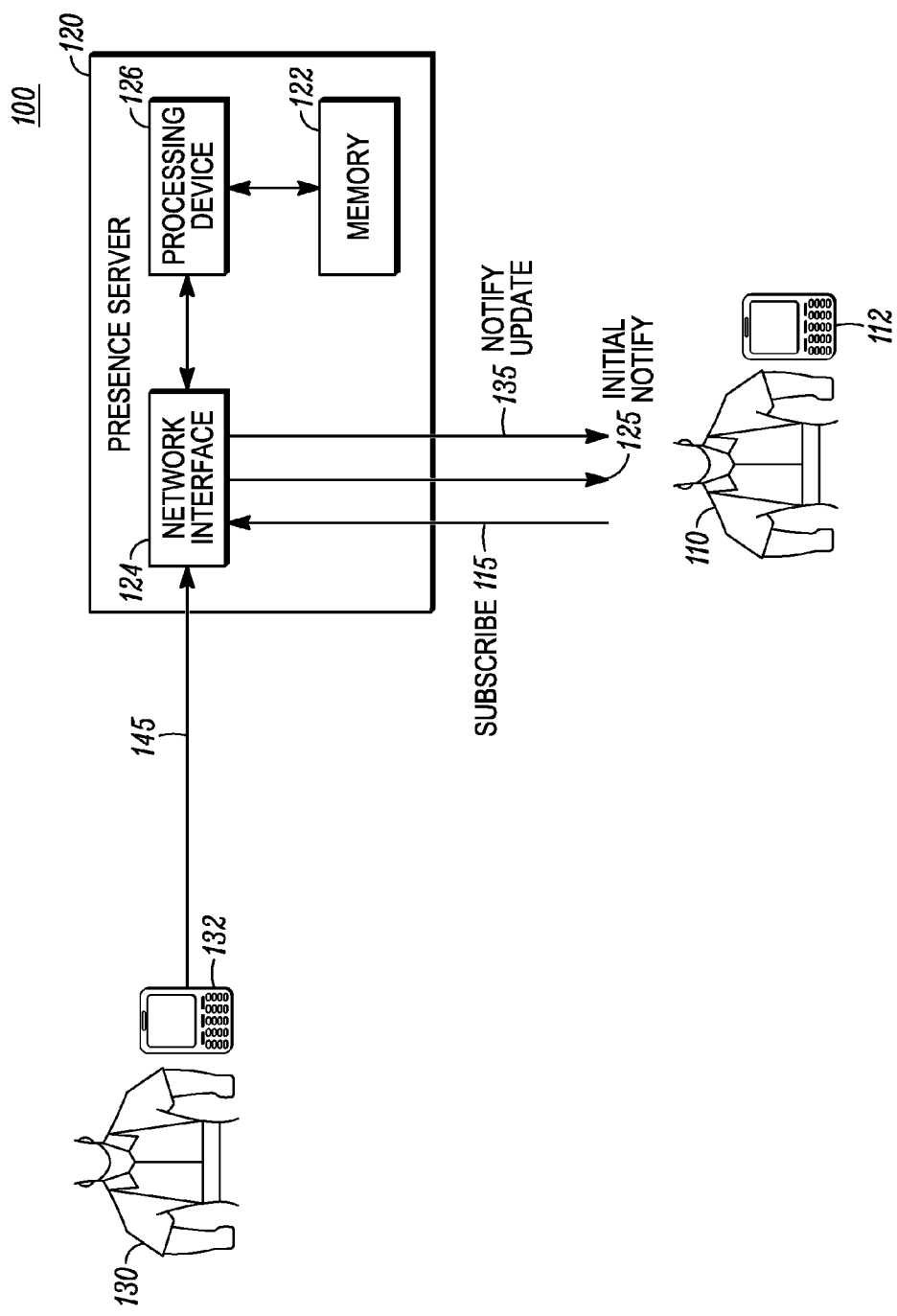
FIG. 1 is a block diagram of a communications system for using recording rules and previous value selection rules for maintaining and distributing presence information in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to the various embodiments, a presence server, in a communications system, maintains previous values for presence information elements according to one or more recording rules and distributes those previous values to watchers according to one or more previous value selection rules. More particularly, the presence server: associates a recording rule with each presence information element in a subset of a plurality of presence information elements for a presentity; maintains a set of previous values according to the recording rule associated with the presence information element, for each presence information element in the subset; receives an initial subscribe request from a watcher for one or more presence information elements in the subset; and in response to the initial subscribe request, notifies the watcher of a number of the previous values maintained for each presence information element in the subscribe request, wherein the number of the previous values that is sent is determined by a previous value selection rule associated with each presence information element.

Referring now to the drawings, and in particular FIG. 1, a block diagram illustrating a communications system is shown and indicated at 100, which maintains and provides previous values of presence information elements by using recording rules and previous value selection rules in accordance with embodiments of the present disclosure. Those skilled in the art will recognize and appreciate that the specifics of the examples in this detailed description are merely illustrative of some embodiments and that the teachings set forth herein are applicable in a variety of alternative settings. For example, in the described embodiments, the presence feature that is implemented in the communications system 100 is performed using proprietary protocols (such as protocols that implement the embodiments of the disclosure described by reference to FIGS. 2 and 3) and standard protocols, such as the Presence SIMPLE Specification (current draft dated Feb. 3, 2009) published by Open Mobile Alliance (OMA) that defines an application level specification for a SIP/SIMPLE-based presence service that makes use of SIP (Session Initiation Protocol described in RFC 3261); and SIMPLE made simple (current draft dated Mar. 9, 2009) published by the Internet Engineering Task Force (IETF) that describes instant messaging and presence using SIP, wherein the standard presence protocols are collectively referred to herein as SIP/SIMPLE. However, the described teachings are in no way limited to this system implementation. Moreover, the system may include more watchers, presentities, presence servers, communication devices, and other entities than what is shown in FIG. 1.

The communications system 100 comprises: a presence server 120; a user 110 using a communication device 112; and a user 130 using a communication device 132, wherein the communication devices 112 and 132, and the presence server 120 are all communicatively coupled over a network (not shown) for presence information subscriptions and corresponding presence information distribution, in accordance with the teachings herein. The network can be a wired network, a wireless network, or a network enabling both wired and wireless communications and usually includes a number of network infrastructure devices including, but not limited to, bridges, switches, zone controllers, base station controllers, repeaters, base radios, base stations, base transceiver stations, access points, routers or any other type of infrastructure equipment interfacing any entity in a wireless or wired environment.

The communication devices 112 and 132 (referred to herein as "client entities") are also referred to in the art as access devices, access terminals, user equipment, mobile stations, mobile subscriber units, mobile devices, and the like, and can be any standard communication device such as radios, mobile phones, Personal Digital Assistants (PDAs), laptops, two-way radios, cell phones, and any other device capable of operating in a wired or wireless environment. Each communication device includes (although not shown) a memory, one or more network interfaces, and a processing device that are operatively coupled.

The network interfaces can be used for, one or more of: publishing presence information for a presentity to the presence server 120; subscribing to presence information for a presentity and, as a result of the subscribing, receiving presence information previous value selections from the presence server 120, in accordance with the teachings herein; and other communications with the presence server 120 to enable the implementation of methods in accordance with the present teachings. The implementation of the network interfaces depends on the particular type of network, i.e., wired and/or wireless, to which the communication devices are connected. For example, where the network supports wired communications, the interfaces may comprise a serial port interface (e.g., compliant to the RS-232 standard), a parallel port interface, an Ethernet interface, a USB interface, and/or a FireWire interface, and the like. Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed in the processing device of the communication device through programmed logic such as software applications or firmware stored on the memory device of the communication device.

Besides the above-mentioned functionality, implemented via programmed logic or code, the processing device of each communication device is further programmed with logic or code for implementing methods such as method 300 described below by reference to FIG. 3; and/or the processing device 126 may be implemented as a state machine or ASIC. The memory in the communication devices can include short-term and/or long-term storage of various data, e.g., presence information, configuration information, etc., needed for the functioning of the communication device. The memory may further store software or firmware for programming the processing device with the logic or code needed to perform its functionality.

Turning now to the presence server 120, it includes a memory 122, one or more network interfaces 124, and a processing device 126 operatively coupled for performing the functionality of the presence server 120. The network interface 124 can be wired, wireless, or a combination of both (examples of which are given above) depending on the particular network to which the presence server 120 is connected. The processing device 126 may be programmed with logic or code to perform its functions, wherein the logic is stored as software and or firmware in the memory 122 (examples of which are given above); and/or the processing device 126 may be implemented as a state machine or ASIC.

Operationally, the presence server 120 receives, in each of a number of publish messages from client entities (such as a message 145 from device 132, which can be for instance a SIP/SIMPLE PUBLISH message), a value for a presence information element pertaining to a presentity. Presence information pertaining to a particular presentity includes one or more presence information elements, and a presentity generally sends many publish messages over a period of time for different or the same presence information elements. The presence server 120 maintains (in the memory 122) a current value; and in accordance with the teachings herein, further maintains (based on one or more recording rules) a set of previous values for at least one of the presence information elements for the presentity. The presence server 120 further receives in one or more subscribe messages from a watcher (such as a subscribe message 115, which can be for instance a SIP/SIMPLE SUBSCRIBE message) a request to be notified regarding one or more presence information elements for a presentity. In response to an initial subscribe request and based on one or more previous value selection rules, the presence server 120 first provides 125 to the watcher (for example in one or more SIP/SIMPLE NOTIFY messages) at least one of the previous values maintained for one or more subscribed to presence information elements and may further send current values for one or more subscribed to presence information elements. Thereafter, the presence server 120 sends notify update messages (e.g., 135, which can be for instance a SIP/SIMPLE NOTIFY message) to update a value for one or more of the subscribed to presence information elements.

Definitions for some of the terms used herein will assist in understanding the disclosed teachings. For instance, a presence server is defined as a functional entity that accepts, stores, and distributes presence information. Presence information is defined as a dynamic set of information pertaining to a presentity that indicates status, reachability, willingness, and/or capabilities of a presentity to communicate. Presence information includes, but is not limited to, such status information as, for instance, user availability, location, network availability, user mood, moving direction, speed, destination, estimated time to reach a destination, distance from a destination, incident phase, completed percentage, stage, or phase of an assigned task during an incident, etc. Presence information is comprised of one or more presence information elements, wherein a presence information element is defined as a basic unit of presence information. A presence information element can be associated with a current alpha-numeric value (also referred to herein simply as a value) and/or a set (i.e., one or more) of previous values. A value for a presence information element is defined as a presence related state for that presence information element at a given point in time. For example, a value for a presence information element can define status of a user, such as "away", "out of office", and the like. Moreover, a set of current values for a number of presence information elements for a presentity at a particular point in time represents the presence state of the presentity at that particular point in time.

A watcher is defined as a uniquely identifiable logical entity, in a device, that is subscribed to certain presence information for one or more presentities. A presentity is defined as a logical entity described by presence information. Presentities may represent devices and/or people, and may also represent other types of entities including, but not limited to, servers, buildings, vehicles, applications, or other logical and physical entities. Also a plurality of presentities may be identified by a Presence Resource List (PRL), which is defined as a pre-defined list of presentities (e.g., "Buddy List") that is traditionally subscribed to in a single operation by a watcher.

A recording rule is defined as an explicit rule or criteria used by the presence server to determine the set of previous values (as opposed to maintaining all such values) for a presence information element to record and maintain in memory. Stated another way, a recording rule determines whether a current value will be added to the set of previous values when replaced with a new current value. Either the same or a different recoding rule can govern different presence information elements for a presentity. This is in contrast to what is known in the art, wherein no recording rules are used; and, therefore, all values are recorded and maintained, limited by the memory in the recording device. A previous value selection rule is defined as a rule or criteria that governs the presence server's selection of which ones of the stored previous values for a presence information element are delivered to a subscribing watcher. Either the same or a different previous value selection rule can govern different presence information elements for a presentity. The described previous value selection rules can be contrasted to known notification filters that simply define the presence information elements for which the watcher will receive a current value and also define when the watcher will receive these current values.

Figure 2:
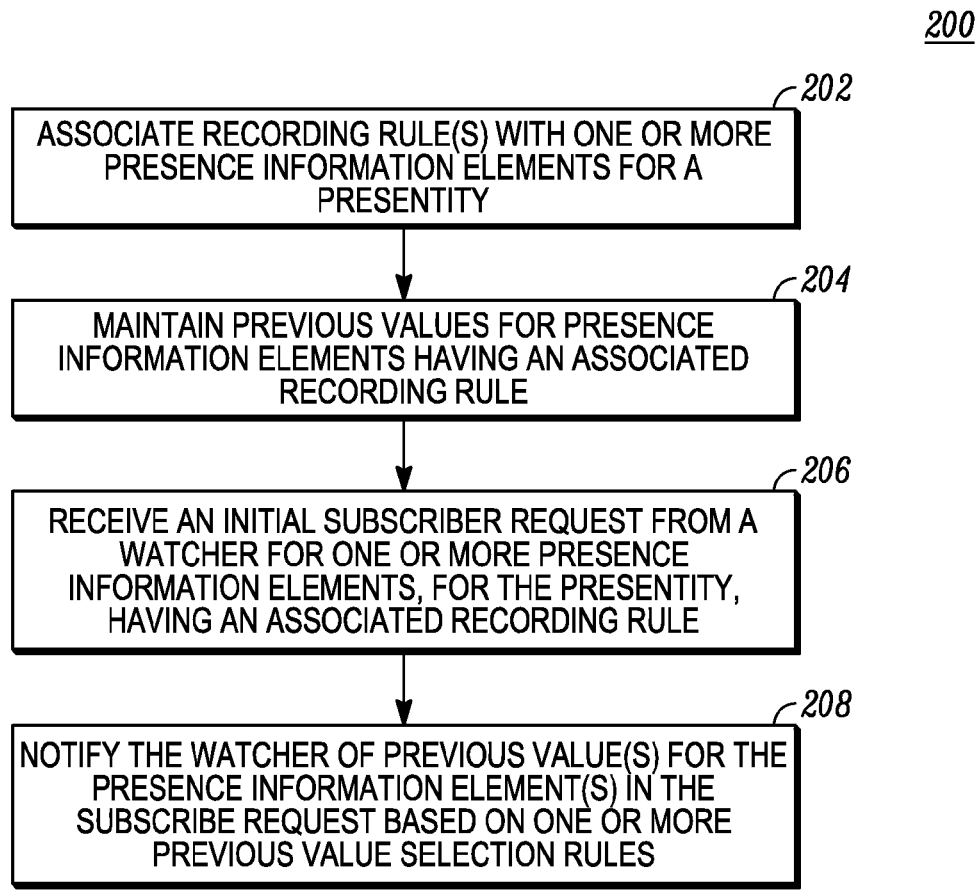
FIG. 2 is a flowchart of a method, at a presence server, for using recording rules and previous value selection rules for maintaining and distributing presence information in accordance with some embodiments.
Figure 3:
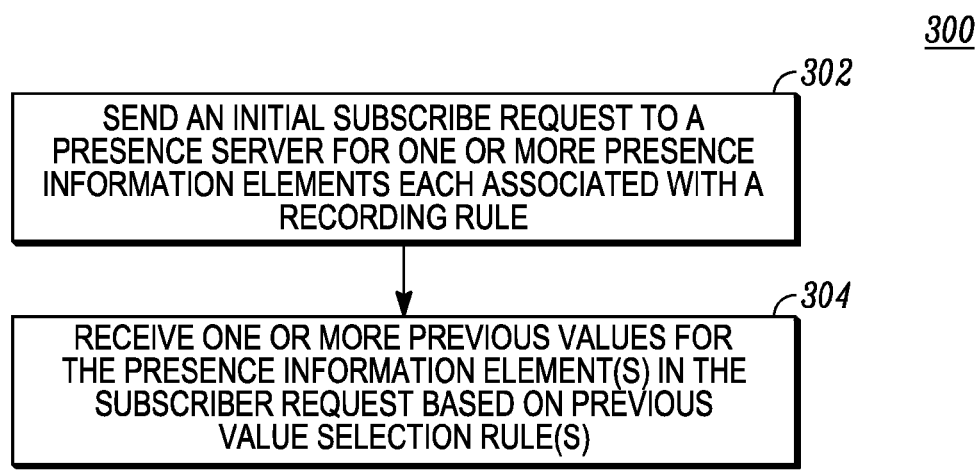
FIG. 3 is a flowchart of a method, at a client entity, for subscribing to presence information in accordance with some embodiments.

Turning now to FIGS. 2 and 3. In FIG. 2, a flow diagram illustrating a method for using recording rules and previous value selection rules for maintaining and distributing presence information for a presentity is shown and indicated at 200. A presence server, such as the presence server 120 shown in FIG. 1, performs at least some of the steps of the method 200, although one or more steps of the method illustrated at 200 can be performed at one or more supporting hardware units external to the presence server 120. FIG. 3 illustrates a flow diagram of a companion method 300, implemented in a client entity, for a subscription to receive previous values for one or more presence information elements for a presentity. Moreover, with respect to the description herein, functionality illustrated and described by reference to the flow diagrams of FIGS. 2 and 3 can be performed by means of, for example, a processing device (examples of which are given below) programmed with logic or code to perform its functions, wherein the logic is stored as software and or firmware in a suitable memory device; and/or a processing device implemented as a state machine or ASIC.

Turning first to method 200 shown in FIG. 2; at 202, the presence server associates a recording rule with one or more presence information elements for a presentity. More particularly, with respect to a given presentity for which the presence server is receiving presence information publications or updates for a plurality ("N") of presence information elements, the presence server maintains only a current value for one portion or subset ("R", i.e., one to N−1) of the N presence information elements and maintains, 204, a set (one or more) of previous values (in addition to the current value) for the remaining (i.e., N−R) presence information elements in the plurality based on the recording rule associated with the presence information element. Associating (or corresponding or binding) a recording rule with a presence information element simply means that the presence server uses any means of identifying (such as through a table, pointers, and the like) the particular recording rule that should be applied to select which of the previous values are recorded for a given presence information element.

As stated earlier, different presence information elements for the same presentity may have associated therewith the same or different recording rules. In addition, the same presence information elements for different presentities may have associated therewith the same or different recording rules. Also, a presentity may allow or instruct the presence server to maintain previous values for some of its presence information elements, or this may be provisioned in the presence server. Moreover, the recording rules that the presence server associates with certain presence information elements may be provided by the presentity or provisioned in the presence server; wherein, in this context, being provisioned in the presence server means that the instructions or permission to record previous values and/or the rules that determine which previous values to maintain are provided to the presence server other than from the presentity, such as being stored a priori via configuration in the presence server or being received in the presence server from a third party such as an application server or an authorized user.

Figure 4:
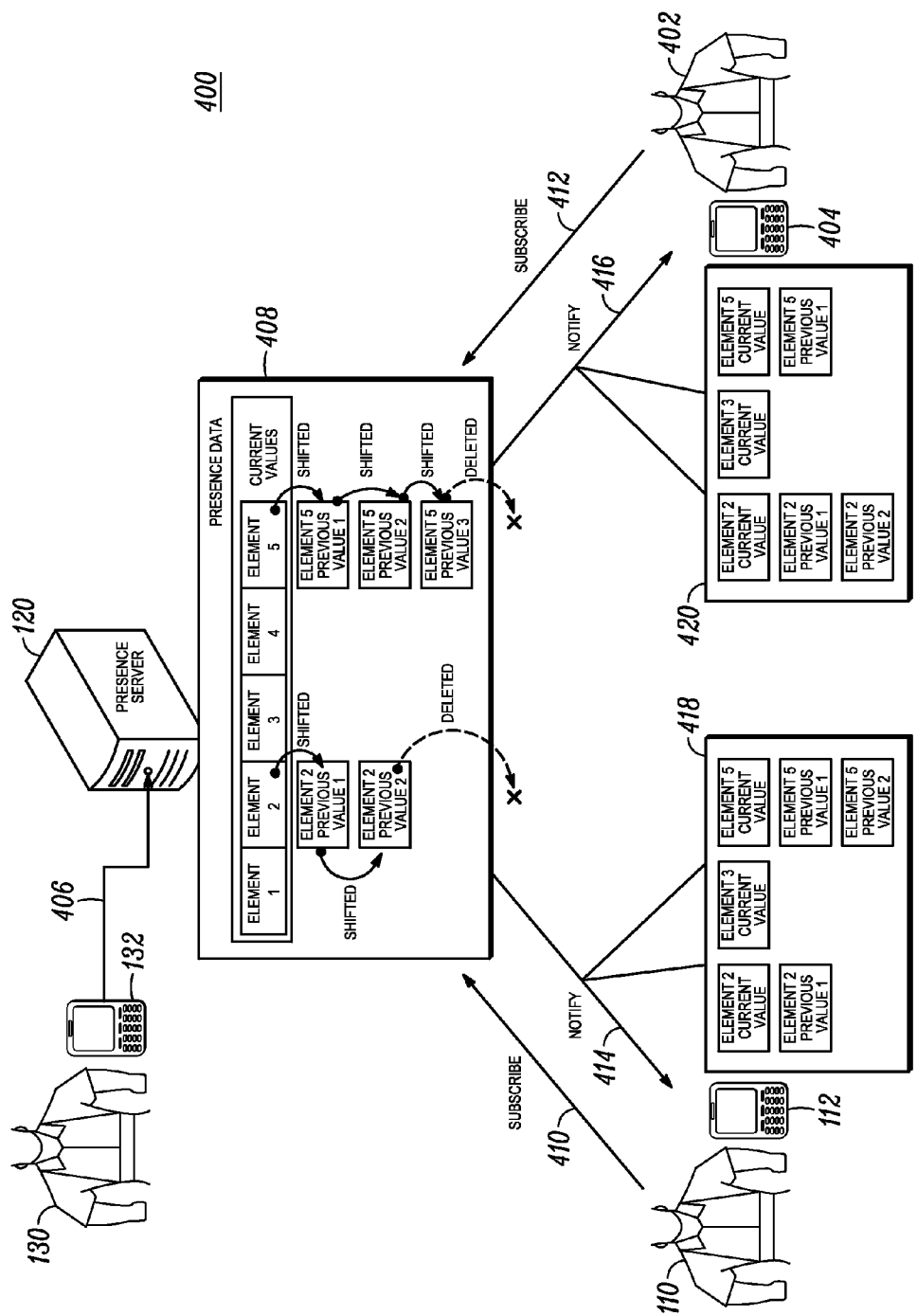
FIG. 4 is a block diagram of a communications system for using recording rules and previous value selection rules for maintaining and distributing presence information in accordance with an illustrative embodiment.

A recording rule may dictate in any number of ways the presence server's selection of the previous values to store and maintain for a given presence information element and may optionally dictate a timestamp and/or other metadata to be tracked with the previous values. In one illustrative implementation, the presence server's application of the recording rule results in the presence server recording and maintaining a fixed number of previous values (e.g., the previous five values) for a presence information element. Turning momentarily to FIG. 4, a system diagram 400 shows the user 130 (presentity) using the client entity 132 to send a series of PUBLISH messages 406 to the presence server 120. Each PUBLISH message 406 includes a current value for one of five presence information elements for the presentity 130. The presence server 120 uses the values received in the messages 406 to compile the presence information 408 for the presentity 130. In an embodiment, publication or reporting of the current values is done using a SIP/SIMPLE PUBLISH method comprising a PUBLISH message from the client entity to the presence server and a corresponding reply message from the presence server to the client entity.

In this illustrative example, the presence server maintains only the current values for presence information elements 1, 3, and 4 but maintains both current values and previous values for presence information elements 2 and 5. As can be seen, presence information element 2 and 5 are associated with recording rules that cause the presence server to maintain a fixed number of previous values, but that fixed number is different for each of these presence information elements (more particularly, the recording rule associated with presence information element 2 causes the presence server to record the last two previous values, and a different recording rule associated with presence information element 5 causes the presence server to record the last three previous values). Accordingly, when the presence server 120 receives a new (updated) value in a message 406 for any of the presence information elements 1 to 5, the presence server replaces the current value of the presence information 408 for that element with the new value. Moreover, for presence information elements 2 and 5, the presence server further shifts the previous values and removes the oldest value from storage so that the proper fixed number of previous values is maintained in accordance with the recording rules associated with these presence information elements.

With further regards to the recording rules, in another illustrative implementation, a recording rule associated with a given presence information element causes the presence server to record a periodic sampling of a total number of previous values published to the presence server. For example, a presentity may continuously publish a number of values that define, for instance, the location of a user or communication device, wherein maintaining all of the previous values would overload memory resources of the presence server after only a short time, especially where the presence server maintains location values for many different presentities. In such a case, the presence server can apply a recording rule such that the presence server maintains only a portion of those location updates, for instance, one in every five or one in every ten location updates provided to the presence server or saving the current value every fifteen minutes (up to a maximum number of samples). Moreover, the recording rule could further provide for whether and when to delete previous values, such as deleting the oldest value when a defined maximum number of previous values is reached or deleting a previous value after it reaches a defined maximum age.

In another illustrative implementation, a recording rule associated with a given presence information element causes the presence server to record previous values reported to the presence server during a sliding window or a specified sliding time interval. For example, based on the recording rule for a presence information element, the presence server records all or a subset (i.e., less than all) of the previous values published to the presence server during the last hour, or whatever specified time interval. Moreover, the recording rule could further define deletion of any values reported outside of the current time window.

In yet another illustrative implementation, a recording rule associated with a given presence information element causes the presence server to start and stop recording previous values based on a set or list of conditions. In other words, certain conditions or events trigger the initiating and ending of the recording of previous values for a presence information element. For example, the presence server could start recording previous values for a presence information element upon receiving a subscription from the first watcher and continue to maintain previous values until the last watcher leaves, at which time all previous values are discarded or otherwise handled in accordance with the recording rule. In another example, the presence server starts recording a periodic sampling of location values for a presentity (e.g., an officer) when the value for a presence information element indicates a condition of "in pursuit" or "on duty" and discontinues recoding the location values when the value for the presence information element no longer indicates the condition of "in pursuit" or indicates a condition of "off duty"; the recording rule could further define how and when these stored previous values are discarded.

As demonstrated by the previous example implementations, much flexibility can be provided for through the use of recording rules to select which particular previous values (i.e., a subset of all total values reported) to record and maintain for a presence information element. Additional examples can be envisioned such as a recording rule that limits which values are added to the set of previous values. For example, if the set of possible values for a presence element indicates (reading e-mail, updating application spec, updating drawing, review claims, etc.) then a recording rule may specify that only two values (e.g., updating application spec, updating drawing) should be recorded and all other values are not saved (or are replaced with "other"). Then for the sequence of published values:

| | |
|---|---|
| 1. reading e-mail | not saved (after receiving no. 2) |
| 2. updating application spec, | saved (after receiving no. 3) |
| 3. reading e-mail | not saved (after receiving no. 4) |
| 4. review claims | not saved (after receiving no. 5) |
| 5. reading e-mail | not saved (after receiving no. 6) |
| 6. updating drawing | saved (after receiving no. 7) |
| 7. review claims | not saved (after receiving no. 8) |
| 8. updating drawing | saved (after receiving no. 9) |
| 9. review claims; | | the current value is "review claim" and the saved previous values are "updating application spec, updating drawing, updating drawing". If the rule defines to use "other", then the saved previous values are "other, updating application spec, other, updating drawing, other, updating drawing".

Turning back to method 200 shown in FIG. 2 and, concurrently, method 300 shown in FIG. 3, at 204, the presence server receives an initial subscribe request sent (302) by a client entity for a watcher in the communication system. An "initial" subscribe request for a given presence information element means the first subscribe request that includes that particular presence information element, which may be the very first subscribe request from the watcher or may be a subsequent subscribe request but the first subscribe request for a particular presence information element. Each subscribe request might include only one presence information element for a presentity. However, in the described embodiment, the subscribe request is for one or more presence information elements, with at least one of the presence information elements in the subscribe request being associated with a recording rule. In an embodiment, the subscribe request comprises a SIP/SIMPLE SUBSCRIBE method comprising a SUBSCRIBE message from the client entity to the presence server and a corresponding reply message from the presence server to the client entity.

In response to the initial subscribe request and for all of the presence information elements having an associated recording rule, the presence server notifies (208) the watcher, via (304) the client entity, of all stored previous values for a presence information element that satisfy a previous value selection rule associated with that presence information element. In an embodiment, the notification comprises a SIP/SIMPLE notify method comprising a NOTIFY message from the client entity to the presence server and a corresponding reply message from the presence server to the client entity.

Each presence information element having an associated recording rule also has an associated previous value selection rule that determines which previous values the presence server provides to the watcher. Associating (or corresponding or binding) a previous value selection rule with a presence information element simply means that the presence server uses any means of identifying (such as through a table, pointers, implicitly as through a global rule, and the like) the particular previous value selection rule that should be applied to select which of the previous values are provided to a watcher for a given presence information element. When a subscribe request includes multiple presence information elements for the same presentity (each associated with a recording rule), these presence information elements may be associated with the same previous value selection rule or with different previous value selection rules. Also, where two different watchers subscribe to the same presence information element for a presentity, the presence information element may be associated with the same previous value selection rule for the different watchers or with different previous value selection rules.

Turning back to FIG. 4, system 400 further shows the user 110 using the communication device 112 and a user 402 using a communication device 404. In this illustrative implementation, user 110 (a first watcher) subscribes (410) to presence information elements 2, 3, and 5 of the presence information 408 for the presentity 130, and in response to the subscription receives a notification (414) (that may be comprised of one or more SIP/SIMPLE NOTIFY messages) of presence information 418 that includes only the current value for presence information element 3 (as in the prior art) but that includes the current value and one previous value for presence information element 2 based on a corresponding previous value selection rule, in accordance with the teachings herein. The presence information 418 further includes the current value and two previous values for presence information element 5 based on a corresponding previous value selection rule that is different than the previous value selection rule for the presence information element 2. It should be further noted that the previous value selection rules for both presence information elements 2 and 5 cause the presence server 120 to send to the watcher 110 only some of the stored previous values (in this case the most recent one of two stored previous values for presence information element 2 and the most recent two of three stored previous values for presence information element 5).

The user 402 (a different watcher) also subscribes (412) to presence information elements 2, 3, and 5 of the presence information 408 for the presentity 130, and in response to the subscription receives a notification (416) (that may be comprised of one or more SIP/SIMPLE NOTIFY messages) of presence information 420 that includes only the current value for presence information element 3 (as in the prior art) but that includes different sets of previous values for presence information elements 2 and 5. In this illustrative implementation, the presence information 420 includes the current value and all previous values for presence information element 2 based on a corresponding previous value selection rule and includes the current value and only one previous value for presence information element 5 based on a corresponding previous value selection rule that is different than the previous value selection rule for the presence information element 2.

As shown above, there can be any number of variations in the previous value selection rules that define the number of the stored previous values for a presence information element that are provided to a watcher. The presence server can provide all of the stored previous values (for instance, as with an implicit global previous value selection rule, wherein the presence server provides all stored previous values for presence information elements in response to the initial subscribe request, or based on an explicit rule that provides for such) or can provide only a select subset of the total number of stored previous values based on the particular explicit previous value selection rule. Also, the same watcher can receive the same or a different number of previous values for different presence information elements for a presentity; or different watchers can receive the same or a different number of previous values for the same presence information elements.

In addition, there can be variations in how the presence server "learns" or "knows" of the previous value selection rule that it associates with each presence information element that has a recording rule. In one illustrative implementation, the previous value selection rule is identified by the watcher, for instance in the initial subscribe request or in some other message. In another illustrative implementation, the previous value selection rule is provisioned in the presence server; wherein, in this context, being provisioned in the presence server means that the previous value selection rule is provided to the presence server other than from the watcher, such as being stored a priori via configuration in the presence server or being received in the presence server from a third party such as an application server, an authorized user, or the presentity.

Moreover, where an initial subscribe request contains multiple presence information elements associated with recording rules, the previous value selection rules may all be provisioned in the server or provided by the watcher or some combination of both (with one or more of the previous value selection rules being provisioned in the server and one or more of the previous value selection rules being provided by the watcher). In addition, in case a presence information element has a previous value selection rule provided by the watcher and a different previous value selection rule provisioned in the server, the presence server is further provisioned with an override mechanism that causes the presence server to override one of the two previous value selection rules. Finally, after initially providing the previous values for a presence information element, in an embodiment, the presence server automatically provides only current values for all of the subscribed to presence information elements in subsequent notifications instead of continuing to provide previous values. However, in alternative embodiments, some or all of the previous values may be provided to a watcher several times.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for maintaining and distributing presence information, the method comprising:
at a presence server:
associating a recording rules with presence information elements for a user of a communication device, wherein each presence information element has its own recording rule;
maintaining a set of values for previous presence information elements for the user based on the recording rule;
receiving a request from a watcher for values of previous presence information elements for the user; and
in response to the request, notifying the watcher of the values of previous presence information elements for the user wherein the step of notifying the watcher of the values of previous presence information elements comprises the step of providing a number of values of previous presence information elements to the watcher, wherein the number is based on a selection rule provisioned in the presence server; or wherein the step of notifying the watcher of the values of previous presence information elements comprises the step of providing a number of values of previous presence information elements to the watcher, wherein the number is based on a selection rule sent to the presence server from a third party other than the watcher.

2. The method of claim 1, wherein maintaining the set of values of previous presence information elements comprises maintaining a fixed number of values of previous presence information elements.

3. The method of claim 1, wherein maintaining the set of values of previous presence information elements comprises recording a periodic sampling of a total number of previous presence information elements.

4. The method of claim 1, wherein maintaining the set of values of previous presence information elements comprises recording a plurality of values of previous presence information elements r during a sliding time window.

5. The method of claim 1, wherein maintaining the set of values of previous presence information elements comprises initiating and ending recording of values of the previous presence information elements based on a list of conditions.

6. The method of claim 1, wherein the recording rule associated with a first presence information element is different from the recording rule associated with a second presence information element.

7. The method of claim 1, wherein at least one recording rule is identified by the user of the communication device.

8. The method of claim 1, wherein at least one recording rule is provisioned in the presence server.

9. The method of claim 8, wherein at least one recording rule is sent to the presence server from a third party other than the user of the communication device.

10. The method of claim 1, wherein the step of notifying the watcher of the values of previous presence information elements comprises the step of providing a number of values of previous presence information elements to the watcher, wherein the number is based on a selection rule is identified in an initial subscribe request.

11. The method of claim 1, wherein the selection rule is sent to the presence server from the communication device.

12. The method of claim 1 further comprising:
at the presence server:
receiving a second subscribe request from a second watcher for the previous presence information element; and
in response to the second subscribe request, notifying the second watcher of a number of the previous values maintained for the first presence information element, which is determined by a second selection rule associated with the first presence information element that is different from the first selection rule.

13. A method for subscribing to presence information, the method comprising:
at a client entity:
sending an initial subscribe request to a presence server for a first presence information element for a user of a communication device, wherein the first presence information element is associated, at the presence server, with a first recording rule for maintaining a set of previous values for the first presence information element; and in response to the initial subscribe request, receiving a number of the previous values maintained for the first presence information element, wherein the number of the previous values is determined by a first previous value selection rule associated with the first presence information element; wherein the initial subscribe request is further for a second presence information element in the subset, the method further comprising the client entity receiving, in response to the initial subscribe request, a number of the previous values maintained for the second presence information element, which is determined by a second previous value selection rule associated with the second presence information element; and wherein the first previous value selection rule is identified in the initial subscribe request, and the second previous value selection rule is provisioned in the server or provided by a third party.

14. The method of claim 13, wherein the second previous value selection rule is different from the first previous value selection rule.

15. The method of claim 13, wherein the first previous value selection rule is provisioned in the presence server, and the second previous value selection rule is identified in the initial subscriber request.

* * * * *

UNITED STATES PATENT AND TRADEMARK OFFICE
CERTIFICATE OF CORRECTION

PATENT NO. : 8,193,934 B2
APPLICATION NO. : 12/570175
DATED : June 5, 2012
INVENTOR(S) : Agulnik et al.

It is certified that error appears in the above-identified patent and that said Letters Patent is hereby corrected as shown below:

In Column 12, Line 24, in Claim 4, delete "elements r" and insert -- elements --, therefor.

Signed and Sealed this
Eighth Day of January, 2013

David J. Kappos
*Director of the United States Patent and Trademark Office*